US006973411B2

(12) United States Patent
Kim

(10) Patent No.: US 6,973,411 B2
(45) Date of Patent: Dec. 6, 2005

(54) METHOD FOR MANAGING MODULE-RELATED INFORMATION IN MODULAR SYSTEM

(75) Inventor: Ki-suk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 10/114,984

(22) Filed: Apr. 4, 2002

(65) Prior Publication Data
US 2003/0036870 A1  Feb. 20, 2003

(30) Foreign Application Priority Data
Aug. 14, 2001 (KR) .............................. 2001-49031

(51) Int. Cl.⁷ ............................................ G06F 13/00
(52) U.S. Cl. ...................... 702/182; 702/186; 702/188; 348/552
(58) Field of Search ..................... 702/119, 182, 108, 702/117, 118, 120, 123, 183, 186–188; 710/8–10, 710/15–21; 711/1, 5, 100; 725/85, 93, 107, 725/109–111, 116–118, 131, 132, 139, 140, 725/151–153; 348/388.1, 552, 553, 563, 348/564, 567, 175, 180, 181, 184, 185, 187, 348/211.1, 211.3; 704/224; 386/83; 370/241, 370/245, 351; 700/26, 27

(56) References Cited

U.S. PATENT DOCUMENTS

| 6,038,625 A | * | 3/2000 | Ogino et al. ................. 710/104 |
| 6,052,750 A | * | 4/2000 | Lea ............................. 710/72 |
| 6,377,861 B1 | * | 4/2002 | York ........................... 700/83 |
| 2002/0008779 A1 | * | 1/2002 | Ju et al. ....................... 348/552 |

* cited by examiner

Primary Examiner—Hal Wachsman
(74) Attorney, Agent, or Firm—Robert E. Bushnell, Esq.

(57) ABSTRACT

A technique for managing module-related information in a modular system includes a plurality of modules having different functions and a base module for controlling the operation of each of the plurality of modules by interfacing with each of the plurality of modules. The technique includes obtaining module-related information stored in a module connected to the base module, and storing the module-related information obtained from the module in a module information memory accessed by the base module. Accordingly, the method for managing module-related information can be used to transmit information necessary for operation of each module to a base module or can produce as methods for updating module-related information and maintaining the latest version of module-related information.

15 Claims, 5 Drawing Sheets

METHOD FOR MANAGING MODULE-RELATED INFORMATION IN MODULAR SYSTEM

CLAIM OF PRIORITY

This application makes reference to, incorporates the same herein, and claims all benefits accruing under 35 U.S.C. §119 from an application for METHOD FOR MANAGING INFORMATIONS RELATED THE MODULE OF MODULAR SYSTEM earlier filed in the Korean Industrial Property Office on 14 Aug. 2001 and there duly assigned Serial No. 2001-49031.

BACKGROUND OF THE INVENTION

1. Field of the Invention

The present invention relates to a modular system which includes a plurality of functional blocks, that is, modules, and more particularly, to a method for managing module-related information required to obtain, maintain, and update identification codes or programs necessary for operations of modules in a modular system.

2. Description of the Related Art

A modular television receiver (hereinafter, referred to as a modular TV) is a television receiver that has adopted the structure of a personal computer and includes a base module, which processes A/V (audio/video) data, provides the processed A/V data to a display device, and provides an interface to the user, and one or more functional blocks (i.e., modules such as a NTSC (National television system committee) TV, a cable TV, a DSS (digital satellite service) TV, Internet, a digital video disc (DVD, also called digital versatile disc), or a game), which are connected to the base module through an interface means and communicate with the base module.

The modular TV helps a plurality of individual A/V devices to be integrated into one system and allows various electric home appliances having different functions to be connected to one another without the need of complicated external connection lines.

The base module in the modular TV is required to maintain and manage module-related information, including the identification code of each module, drive programs, usage guides, or help messages, so that the modules operate smoothly and interface well with the user. For example, drive programs, which are information that is necessary for the operation of modules, may frequently be varied in accordance with different needs, such as the need for correcting bugs or improving performance, and thus a modular system is necessary to effectively obtain and update module-related information of modules connected to the modular system.

SUMMARY OF THE INVENTION

To solve the above-described and other problems, it is an object of the present invention to provide a method for managing module-related information in a modular system including obtaining, maintaining and updating information required for the operation of each module.

It is another object to provide a technique for managing module-related information that can be used to quickly transmit information necessary for smooth operation of each module to a base module.

Accordingly, to achieve the above and other objects, there is provided a method for managing module-related information in a modular system, which includes a plurality of modules having different functions and a base module for controlling the operation of each of the plurality of modules by interfacing with each of the plurality of modules, the method including obtaining module-related information stored in a module connected to the base module, and storing the module-related information obtained from the module in a module information memory accessed by the base module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, the present invention will now be described more fully with reference to the accompanying drawings.

Figure 1:
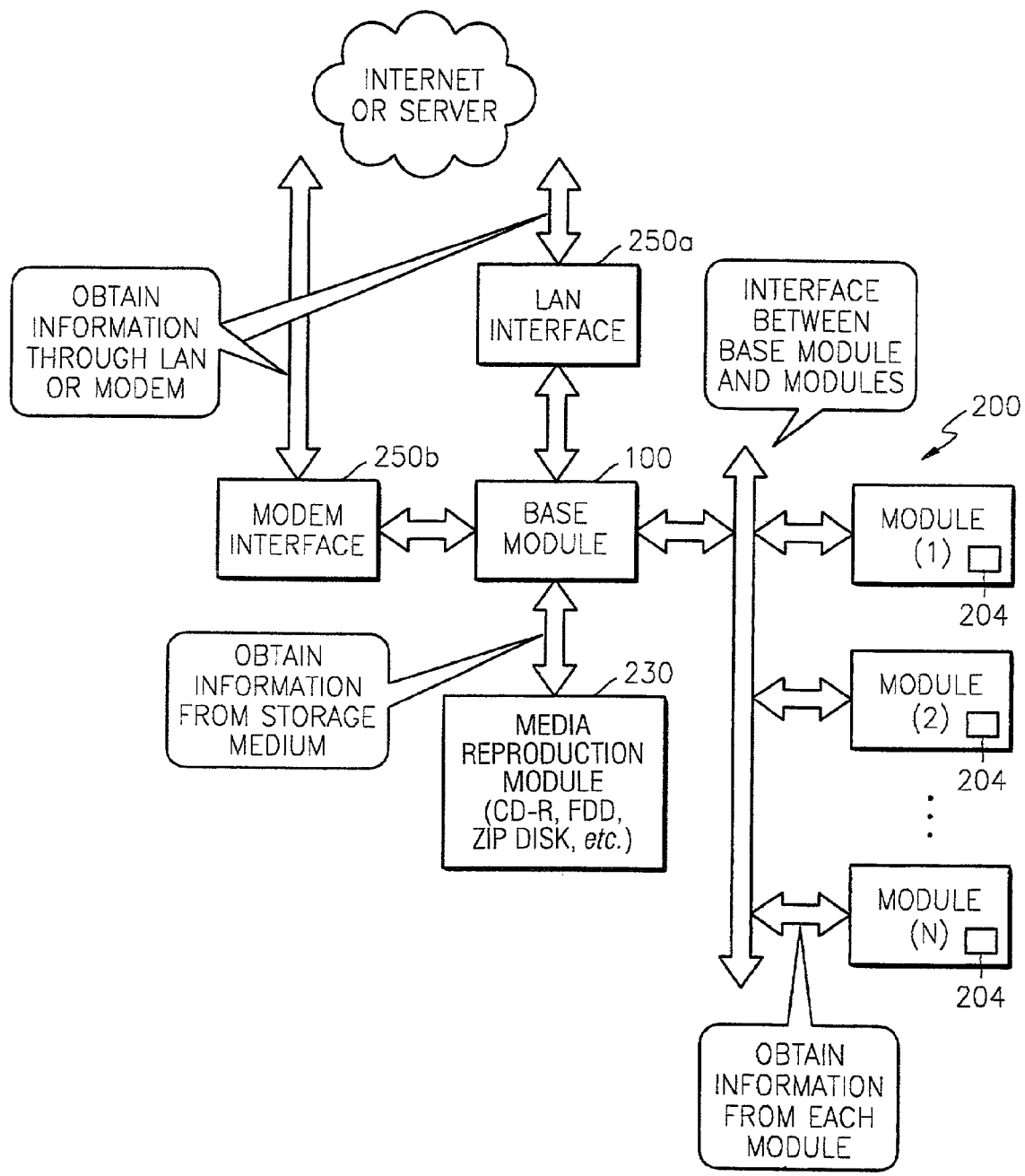
FIG. 1 is a diagram illustrating a method for managing module-related information according to the present invention.

FIG. 1 is a diagram illustrating a method for managing module-related information according to the present invention. In FIG. 1, a modular system includes a base module 100, modules 200, a network connection module including a LAN (local area network) interface module 250a and a MODEM interface module 250b, and a media reproduction module 230.

Information required for the operations of the modules 200 including the identification code of each of the modules 200, drive programs, usage guides, and help messages can be obtained from the modules 200 or can be provided by an Internet server or a network server, or by other media. Each of the modules 200 includes a memory 204 for storing the module-related information and provides the module-related information to the base module 100 through an IEEE (Institute of Electrical and Electronics Engineers) 1394 interface.

The base module 100 obtains and stores the module-related information in a module information memory, which can be accessed by the base module 100, and waits for being used by a user. When the user selects a module 200 to be used, the base module 100 controls the operation of the module 200 to be used by referring to the module-related information of the module 200 to be used which is stored in the module information memory.

The module-related information may be provided by an Internet server or a network server through a network connection module, such as the LAN interface module 250*a* or the MODEM interface module 250*b*. Alternatively, the module-related information maybe provided by the media reproduction module 230, such as a CD-R (recordable compact disc), a floppy disk drive (FDD), a hard disk drive (HDD), or a ZIP disk.

Pieces of module-related information are simultaneously obtained from the modules 200 connected to the modular system, when operating the modular system. This is because whether or not each of the modules 200 is used may be frequently be varied. Accordingly, it is ineffective to obtain the module-related information every time any of the modules 200 is used. Rather, it is more effective to simultaneously obtain the module-related information from the modules 200 connected to the modular system, when operating the modular system and refer to the module-related information as occasion demands.

Figure 2:
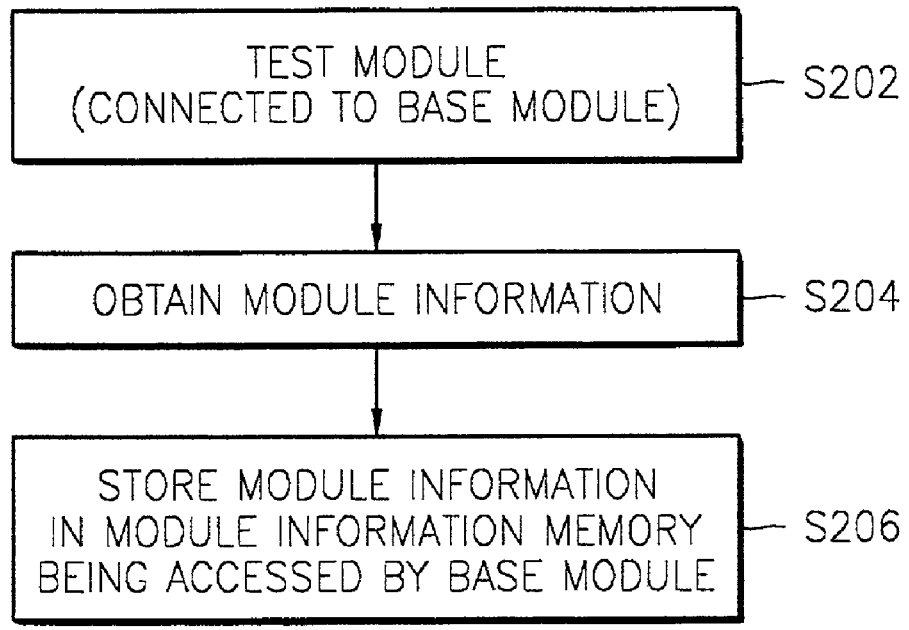
FIG. 2 is a flowchart illustrating a process of obtaining module-related information in a method for managing module-related information according to the present invention.

FIG. 2 is a flowchart illustrating a process of obtaining module-related information in a method for managing module-related information according to the present invention. Referring to FIG. 2, if a modular TV begins to operate, the base module 100 tests the modules connected to the base module 100 in step S202.

The base module 100 begins to obtain module-related information from modules 200, whose existence have already been identified, in step S204. The modules 200 transmit their respective module-related information stored in their respective memories to the base module 100 by communicating with the base module 100 following IEEE 1394 standard for communication.

Figure 5:
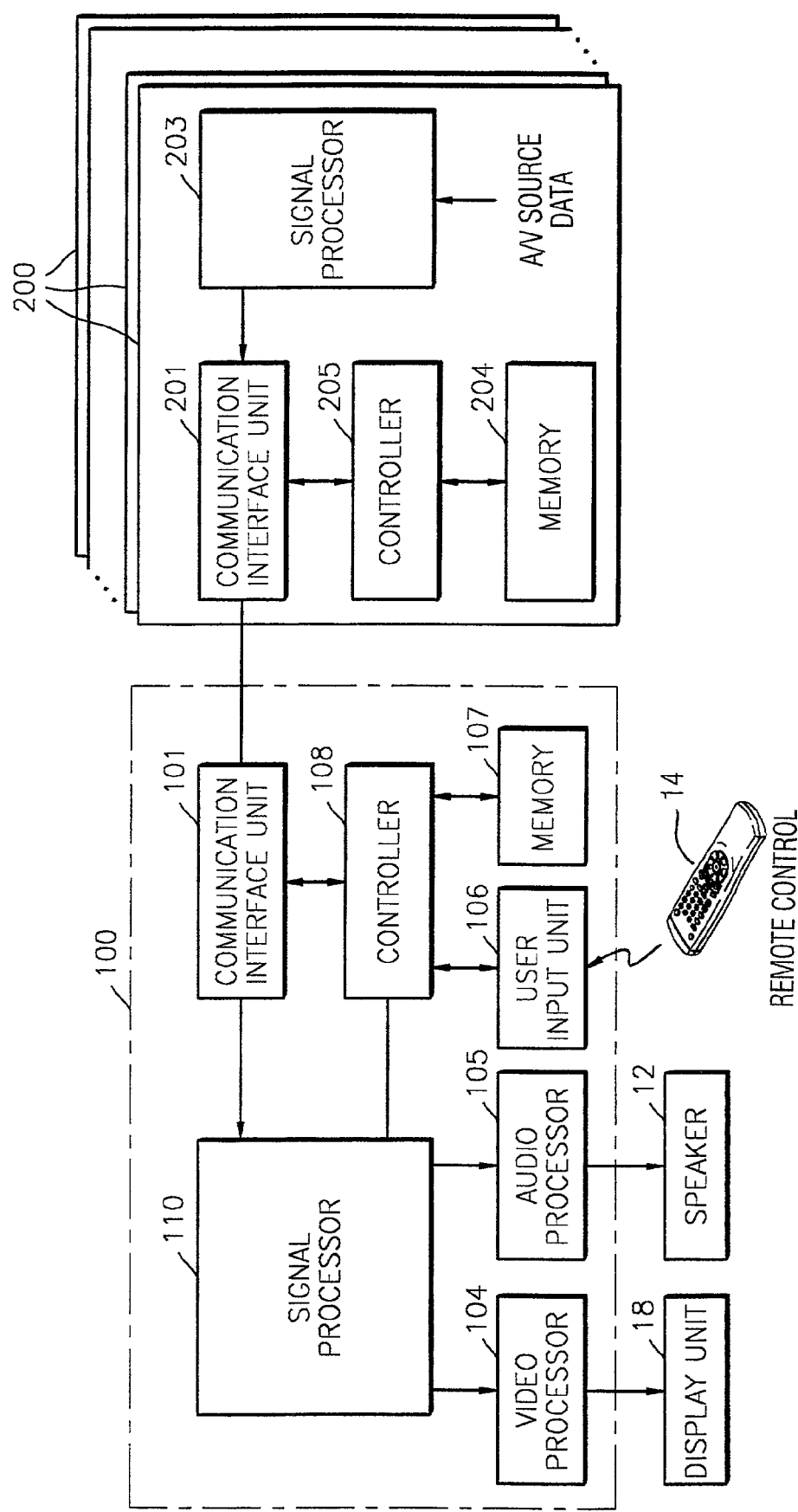
FIG. 5 is a block diagram illustrating the structure of a modular TV, to which a method for managing module-related information according to the present invention is applied.

In step S206, the base module 100 stores the module-related information obtained from the modules 200 in the module information memory, which can be accessed by the base module 100. The module information memory may be replaced by another memory module. Preferably, the module information memory is included in the base module 100 as seen in FIG. 5 with memory 107. The module information memory may also be outside the base module 100.

The module-related information preferably includes the version information of each of the modules 200. The base module 100 compares the version information of each of the modules 200 that has already been stored in the module information memory to the version information of each of the modules that is newly obtained from each of the modules 200 and updates the version information of each of the modules 200, if necessary. In a case where the newly-obtained version information is the same as the previous version information or is older than the previous version information, there is no need to update the version information of each of the modules 200.

The base module controls the operations of the modules 200 with reference to the module-related information stored in the module information memory.

Figure 3:
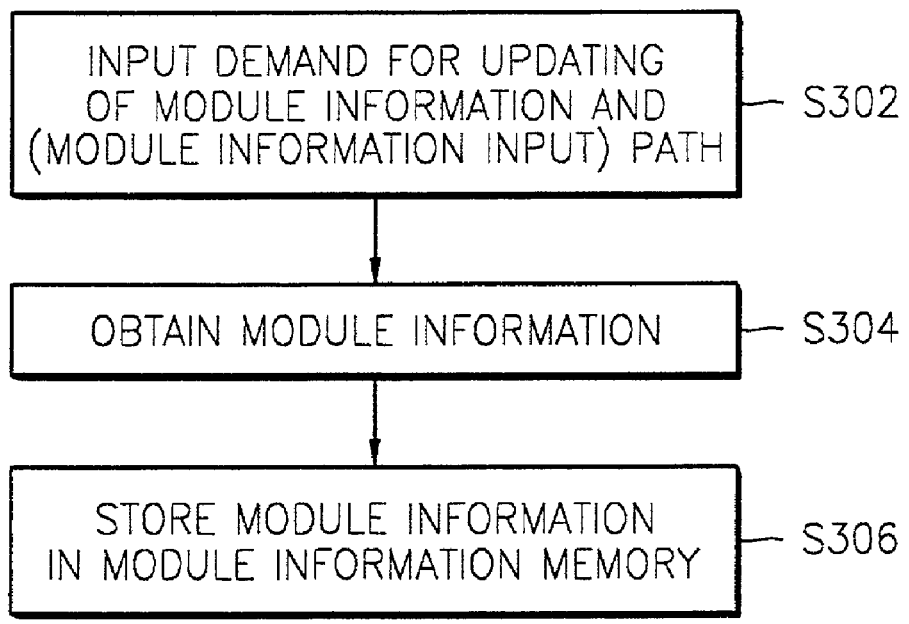
FIG. 3 is a flowchart illustrating an example of a process of updating module-related information in a method for managing module-related information according to the present invention.

FIG. 3 is a flowchart illustrating an example of a process of updating module-related information in a method for managing module-related information according to the present invention. Referring to FIG. 3, the user's demand for updating of module-related information and a path by which the base module 100 can obtain module-related information are input into the base module 100 in step S302.

The user's demand for updating of module-related information can be input into the base module 100 via a menu. It is quite clear to those skilled in the art that the user can input information on his selection and supplementary information into the base module 100 by interfacing with the base module 100 with the use of a menu.

The base module 100 obtains new module-related information by accessing the path input in step 302, in step S304.

Next, the base module 100 replaces module-related information previously stored in the module information memory with the new module-related information in step S306.

The path input in step S302 maybe an address on a network, which can be accessed by the LAN interface module 250*a* or the MODEM interface module 250*b*, or may be the media reproduction module 230. The media reproduction module 230 may be a CD-R, an FDD, an HDD, or a ZIP disk.

In a case where the path input in step S302 is an address on a network, the base module 100 accesses the path through the LAN interface module 250*a* and the MODEM interface module 250*b*. In some cases, it is required that the identification code of a user or a product be input into a server. Since the identification code of a user or a product is included in the module-related information obtained from the modules 200, the module-related information can be input into the server.

Figure 4:
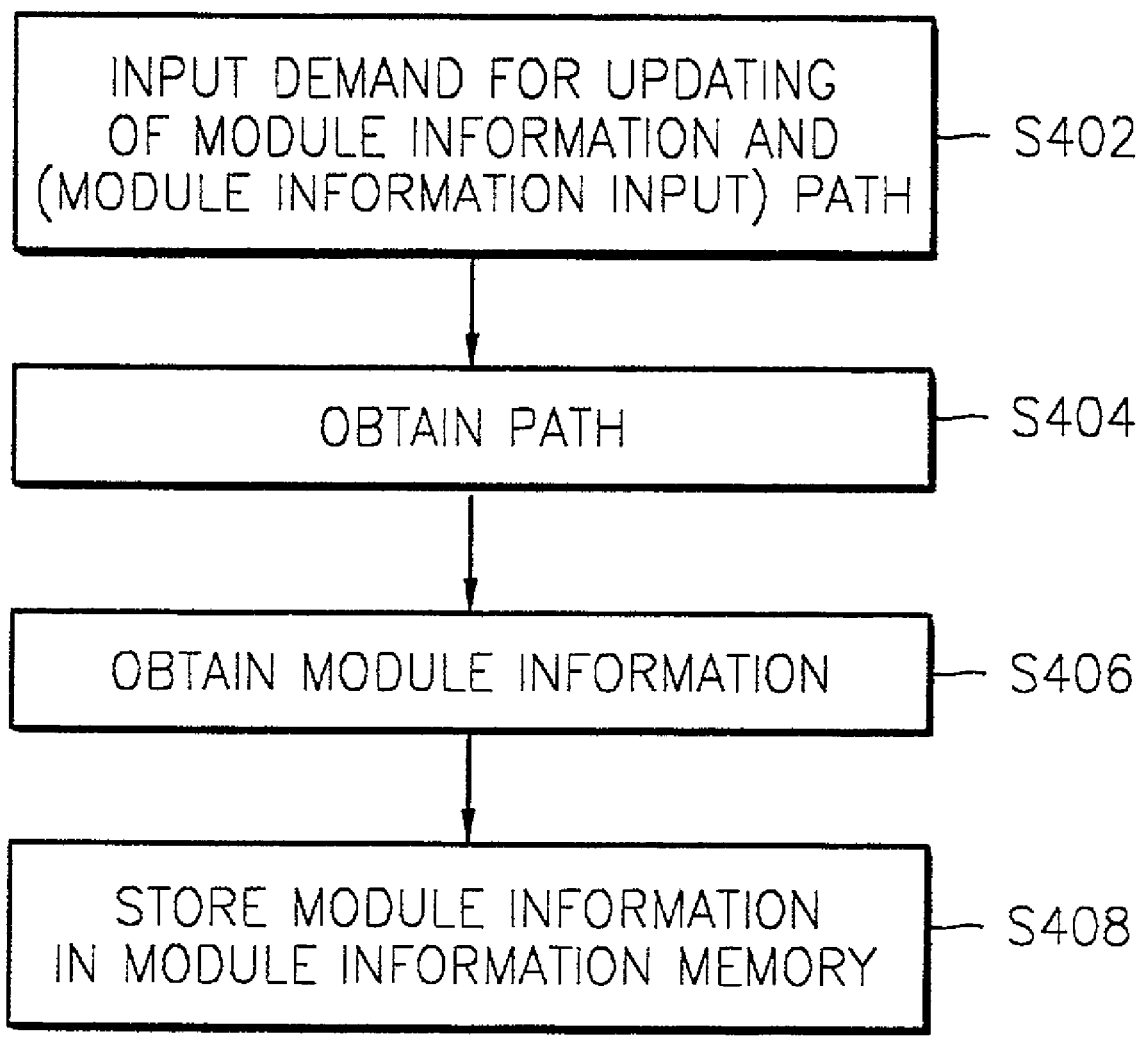
FIG. 4 is a flowchart illustrating another example of a process of updating module-related information in a method for managing module-related information according to the present invention.

FIG. 4 is a flowchart illustrating another example of a process of updating module-related information in a method for managing module-related information according to the present invention. The example shown in FIG. 4 is useful when applied to a case where the path, by which the base module 100 can obtain module-related information, is included in the module-related information stored in the module information memory of the base module 100.

Referring to FIG. 4, the base module 100 receives a demand for updating of module-related information from the user in step S402.

The user's demand for updating of module-related information can be received via a menu.

Next, if the demand for updating of module-related information is received, the base module 100 obtains a path, by which it can obtain module-related information, by accessing the module information memory where the module-related information is stored in step S404.

Next, the base module 100 accesses the path, by which it can obtain module-related information, through the LAN interface module 250*a* and the MODEM interface module 250*b*, thus obtaining new module-related information in step S406.

Next, the module-related information stored in the module information memory is replaced by the new module-related information in step S408.

Here, the path, by which the base module 100 can obtain the new module-related information, is an address on a network which can be accessed through the LAN or MODEM.

The identification of a user or a product is included in the new module-related information obtained from the modules 200.

FIG. 5 is a block diagram illustrating the structure of a modular TV, to which a method for managing module-related information according to the present invention is applied. Referring to FIG. 5, a base module 100 includes a communication interface unit 101, a signal processor 110, a video processor 104, an audio processor 105, a user input unit 106, a memory 107, and a controller 108.

The memory 107 may be a random-access memory (RAM), a read-only memory (ROM), or a flash memory. A browser for searching modules 200, the IP (Internet protocol) address of each of the modules 200, and module-related information are stored in the memory 107.

The controller 108 receives the IP (Internet protocol) address of each of the modules 200 connected to the base module 100 (or the IP address of a module connected to the base module 100) and performs client-server communication with the module 200 through the communication interface unit 101 via a browser stored in the memory 107.

The user input unit 106 receives data input with the use of command keys (not shown) or a remote controller 14 by the user and transmits the information to the controller 108.

The signal processor 110 divides A/V (audio and visual) data received from the communication interface unit 101 into video data and audio data and outputs the video data and the audio data to the video processor 104 and the audio processor 105, respectively. The video processor 104 processes the video data output from the signal processor 110 and transmits the processed video data to a display unit 18. The audio processor 104 processes the audio data output from the signal processor 110 and outputs the processed audio data to a speaker 12.

Module-related information required for the operation of each of the modules 200, including the identification code of each of the modules 200, drive programs, usage guides, or help messages, can be obtained from the modules 200. Each of the modules 200 includes a memory 204 and provides its information to the base module 100 through interface performed according to the IEEE 1394 standard.

The base module 100 obtains module-related information from each of the modules 200 connected to the base module 100, stores the module-related information in the memory 107, and prepares for what is being used by the user. When the user selects a module 200 to be used, the base module 100 controls the operation of the module 200 by referring to the module-related information of the module 200 stored in the memory 107.

Figure 6:
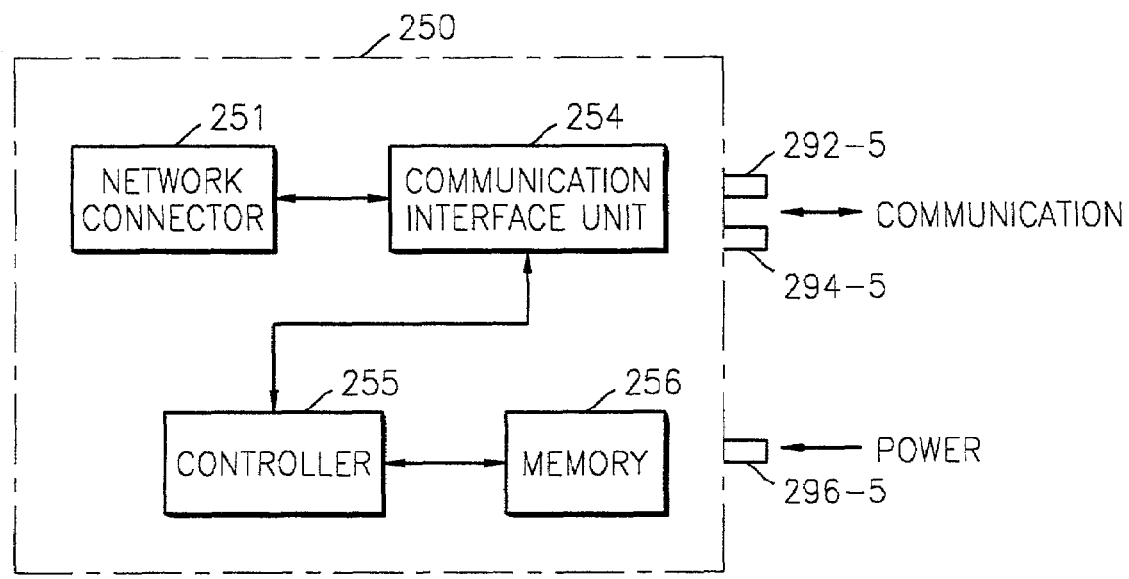
FIG. 6 is a block diagram illustrating the structure of a network connection module, which is an example of a module shown in FIG. 5.

FIG. 6 is a block diagram illustrating the structure of a network connection module 250. The network connection module 250 includes a network connector 251, a communication interface unit 254, a memory 256, and a controller 255. The network connection module 250 also includes communication ports 292-5 and 294-5 and a connector 296-5 for supplying power. The communication ports 292-5 and 294-5 and the connector 296-5 protrude outside the case of the network connection module 250.

The network connector 251 is connected to the Internet or a network having an accessible server, and the communication interface unit 254 communicates with the base module 100. The memory 256 stores the IP address of a module, an index page, and module-related information. A user interface adopting a graphic user interface (GUI) manner, which is capable of controlling the network connection module 250, is shown on the index page (e.g. index.html).

The controller 255 provides the IP address of a module, the index page, module-related information to the base module 100 and controls a web page received via the network connector 251 in response to a user's input received from the base module 100 to be transmitted to the base module 100 through the communication interface unit 254. The communication interface unit 254, like the network connector 251, can be realized as an IEEE 1394 interface following IEEE 1394 protocol.

Figure 7:
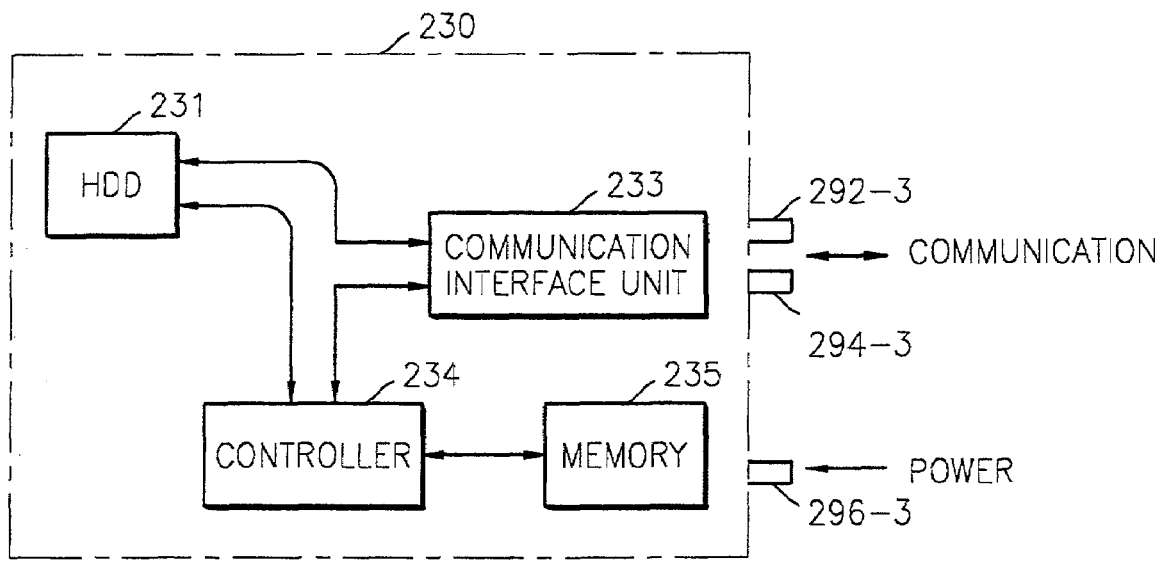
FIG. 7 is a block diagram illustrating the structure of a hard disk drive module, which is an example of the module shown in FIG. 5.

FIG. 7 is a block diagram illustrating the structure of a hard disk drive module which is an example of a media reproduction module. Referring to FIG. 7, a hard disk drive module 230 includes a hard disk drive 231, a communication interface unit 233, a memory 235, and a controller 234. The hard disk drive module 230 also includes communication ports 292-3 and 294-3 and a connector 296-3 for supplying power. The communication ports 293-4 and 294-3 and the connector 296-3 protrude outside the case of the hard disk drive module 230.

The IP address of a module and an index page are stored in the memory 235. A user interface adopting a graphic user interface (GUI) manner, which is capable of controlling the hard disk drive module 230, is shown on the index page. The communication interface unit 233 communicates with the base module 100. The controller 234 provides the IP address of a module and the index page, which are allotted to the hard disk drive module 230, to the base module 100 and controls data recorded in the hard disk drive 231 in response to a user's input received from the base module 100 to be transmitted to the base module 100 via the communication interface unit 233. The communication interface unit 233, like the network connection module 250 shown in FIG. 6, can be realized as an IEEE 1394 interface following IEEE 1394 protocol.

As described above, the method for managing module-related information according to the present invention can be used to quickly transmit information necessary for smooth operation of each module to a base module or can produce almost the same effects as methods for updating module-related information and maintaining the latest version of module-related information.

What is claimed is:

1. A method for managing module-related information in a modular system, which comprises a plurality of modules having different functions and a base module for controlling the operation of each of the plurality of modules by interfacing with each of the plurality of modules, the method comprising:

obtaining simultaneously module-related information stored in each one of said plurality of modules connected to said base module; and storing said module-related information obtained from said modules in a module information memory accessed by said base module, further comprised of said module-related information including version information, the version of module-related information previously stored in said module information memory being compared with the version of newly-obtained module-related information, and whether the version is the previous version of module-related information or the new version of module-related information that is stored is determined based on the results of comparison in said step of storing said module-related information.

2. A method for managing module-related information in a modular system, which comprises a plurality of modules having different functions and a base module for controlling the operation of each of the plurality of modules by interfacing with each of the plurality of modules, the method comprising:

obtaining simultaneously module-related information stored in each one of said plurality of modules connected to said base module;

storing said module-related information obtained from said modules in a module information memory accessed by said base module;

receiving a demand for updating of module-related information and a path, by which module-related information can be obtained, through a user interface;

obtaining said module-related information by accessing the received path; and replacing module-related information stored in said module information memory with the newly-obtained module-related information.

3. The method of claim 2, further comprised of the path being an address on a network accommodating being accessed through any one of a local area network and modem.

4. The method of claim 2, further comprised of the path being a media storage unit connected to said modular system.

5. A method for managing module-related information in a modular system, which comprises a plurality of modules having different functions and a base module for controlling the operation of each of the plurality of modules by interfacing with each of the plurality of modules, the method comprising:
- obtaining simultaneously module-related information stored in each one of said plurality of modules connected to said base module;
- storing said module-related information obtained from said modules in a module information memory accessed by said base module,
- receiving a demand for manually updating of module-related information through a user interface;
- obtaining a path, selected manually by a user through said user interface, by which module-related information can be obtained, from module-related information stored in said module information memory;
- obtaining said module-related information by accessing the path; and
- replacing said module-related information stored in said module information memory with a newly-obtained module-related information.

6. The method of claim 5, further comprised of the path being an address on a network accommodating being accessed through any one of a local area network and modem.

7. The method of claim 5, further comprising identifying whether or not a module connected to said modular system exists before said step of obtaining simultaneously module-related information.

8. The method of claim 7, further comprised of the path being an address on a network which can be accessed through any one of a local area network and modem.

9. A method for managing module-related information in a modular system, which comprises a plurality of modules having different functions and a base module for controlling the operation of each of the plurality of modules by interfacing with each of the plurality of modules, the method comprising:
- obtaining simultaneously module-related information stored in each one of said plurality of modules connected to said base module;
- storing said module-related information obtained from said modules in a module information memory accessed by said base module; and
- identifying whether or not a module connected to said modular system exists before said step of obtaining simultaneously module-related information, and the module-related information including a user identification accommodating an update of the module-related information through a server requiring the user identification.

10. A method for managing module-related information in a modular system, which comprises a plurality of modules having different functions and a base module for controlling the operation of each of the plurality of modules by interfacing with each of the plurality of modules, the method comprising:
- obtaining simultaneously module-related information stored in each one of said plurality of modules connected to said base module;
- storing said module-related information obtained from said modules in a module information memory accessed by said base module; and
- controlling said plurality of modules by referring to module-related information stored in said module information memory and said base module receiving an Internet protocol address of each of the plurality of modules and communicating between said base module and said plurality of modules through a browser stored in said module information memory.

11. A method for a modular television apparatus, comprising:
- testing a plurality of modules connected to a base module by said base module when said modular television apparatus begins to operate, said modular television apparatus including said plurality of modules having different functions and said base module;
- obtaining simultaneously module-related information stored in a plurality of modules connected to said base module when existence of module-related information has been identified, the module-related information including information required for the operations of said plurality of modules; and
- storing module-related information, obtained from said plurality of modules, in a module information memory accessible by said base module.

12. The method of claim 11, with said storing module-related information, further comprising:
- inputting a demand for updating of module-related information and a path accommodating said base module obtaining module-related information;
- obtaining module-related information by said base module through accessing an input path; and
- storing said module-related information in said module information memory.

13. The method of claim 12, further comprising of obtaining the path by accessing said module information memory, the path being included in said module-related information stored in said module information memory.

14. An apparatus, comprising:
- a plurality of modules having different functions and each one of said plurality of modules including a memory storing module-related information;
- a base module connected to said plurality of modules, said base module simultaneously obtaining module-related information stored in said plurality of modules when existence of module-related information has been identified, said base module storm said module-related information, obtained from said plurality of modules, in a module information memory accessible by said base module;
- an input unit inputting a demand for updating of module-related information and a path accommodating said base module obtaining module-related information; and
- a first unit providing the path to said base module, said base module obtaining said module-related information through accessing the path.

15. The apparatus of claim 14, further comprised of said input unit being at least one member selected from a group consisting essentially of a modem interface, network interface, and a media reproduction module.

* * * * *